United States Patent
Hamada

[11] Patent Number: 5,997,036
[45] Date of Patent: Dec. 7, 1999

[54] AIR BAG DEVICE AND METHOD OF PRODUCING SAME

[75] Inventor: Shinji Hamada, Kanagawa, Japan

[73] Assignee: Ikeda Bussan Co., Ltd., Ayase, Japan

[21] Appl. No.: 08/975,060

[22] Filed: Nov. 20, 1997

[30] Foreign Application Priority Data

Dec. 9, 1996 [JP] Japan ................... 8-344661

[51] Int. Cl.⁶ .................................................. B60R 21/16
[52] U.S. Cl. ...................................... 280/743.1; 280/741
[58] Field of Search ............................. 280/743.1, 741, 280/732, 740

[56] References Cited

U.S. PATENT DOCUMENTS

| | | | |
|---|---|---|---|
| 4,153,273 | 5/1979 | Risko | 280/740 |
| 4,964,654 | 10/1990 | Bishop et al. | 280/743 |
| 5,022,675 | 6/1991 | Zelenak et al. | 280/743.1 |
| 5,149,130 | 9/1992 | Wooley et al. | 280/743.1 |
| 5,310,216 | 5/1994 | Wehner et al. | 280/743.1 |
| 5,332,259 | 7/1994 | Conlee et al. | 280/738 |
| 5,503,429 | 4/1996 | Wallner et al. | 280/743.1 |

FOREIGN PATENT DOCUMENTS

| | | |
|---|---|---|
| 44 23 552 A1 | 1/1996 | Germany . |
| 61-185642 | 11/1986 | Japan . |
| 2-523406 | 5/1996 | Japan . |
| 8-119059 | 5/1996 | Japan . |

*Primary Examiner*—Paul N. Dickson
*Attorney, Agent, or Firm*—Foley & Lardner

[57] ABSTRACT

An air bag device comprises an air bag. The bag has a mouth portion which includes first and second outside sewed parts and a center non-sewed part. Each outside sewed part is provided by sewing mutually facing side end sections of the mouth portion and the center non-sewed part includes two mutually facing center end sections each having bolt openings. An elongate gas generator has bolts extending therefrom. The gas generator is substantially entirely received in the mouth portion having the bolts exposed to the outside through the bolt openings of the two mutually facing center end sections. A housing is employed for receiving a unit including the air bag and the gas generator. The housing has bolt openings through which the bolts pass. Nuts are engaged with the bolts to secure the unit to the housing.

4 Claims, 4 Drawing Sheets

5,997,036

AIR BAG DEVICE AND METHOD OF PRODUCING SAME

BACKGROUND OF THE INVENTION

1. Field of the Invention

The present invention relates in general to air bag devices and method of producing same. More particularly, the invention relates to air bag devices for use in a wheeled motor vehicle, which generally comprise a housing fixed to a vehicle body, a gas generator unit installed in the housing and an air bag folded up in the housing with a gas inlet opening thereof connected with a gas outlet opening of the gas generator.

2. Description of the Prior Art

Hitherto, various types of air bag devices have been proposed and put into practical use particularly in the field of wheeled motor vehicles. That is, upon a vehicle collision, an air bag is instantly inflated to protect a passenger seated in front of the air bag device. Some of the conventional air bag devices are described in Japanese Patent 2523406, Japanese Patent First Provisional Publication 8-119059 and Japanese Utility Model First Provisional Application 61-185642.

In order to clarify the task of the present invention, one conventional air bag device 100 will be described in brief with reference to FIGS. 5 and 6 of the accompanying drawings.

The conventional air bag device 100 shown in the drawings comprises a housing 3 (see FIG. 6), a cylindrical gas generator unit 5 installed in the housing 3 and secured to the same by means of bolts 8a and nuts 8b, and an air bag 7 connected at its inlet opening 7a to an outlet of the gas generator unit 5. As shown in FIG. 5, the gas generator unit 5 comprises a cylindrical case 11 and a cylindrical gas generator proper 5a concentrically installed in the cylindrical case 11. The inlet opening 7a of the air bag 7 is connected to an outlet opening of the gas generator proper 5a through openings 11a formed in the cylindrical case 11.

As is seen from FIG. 5, the air bag 7 has at the inlet opening 7a two opposed flaps 9a and 9b each having bolt openings 9c and 9d. As is understood from FIG. 6, upon assembly, the two flaps 9a and 9b are put around the cylindrical case 11 with their leading end portions overlapped having the bolts 8a passed through the bolt openings 9c and 9d which are registered.

However, due to its inherent construction, the above-mentioned conventional air bag device 100 has the following drawback.

As is understood from FIG. 6, upon inflation of the air bag 7, leakage "L" of gas tends to occur at lateral sides of the inlet opening 7a of the air bag 7. In fact, it is difficult to seal such lateral sides because they are substantially exposed to the outside.

SUMMARY OF THE INVENTION

It is therefore an object of the present invention to provide an air bag device which is free of the above-mentioned drawback.

It is another object of the present invention to provide a method for producing such air bag device.

According to a first aspect of the present invention, there is provided an air bag device which comprises an air bag having a mouth portion, the mouth portion including first and second outside sewed parts and a center non-sewed part, each outside sewed part being provided by sewing mutually facing side end sections of the mouth portion, the center non-sewed part including two mutually facing center end sections each having bolt openings; an elongate gas generator having bolts extending therefrom, the gas generator being substantially entirely received in the mouth portion having the bolts exposed to the outside through the bolt openings of the two mutually facing center end sections; a housing for receiving a unit including the air bag and the gas generator, the housing having bolt openings through which the bolts pass; and nuts engaged with the bolts to secure the unit to the housing.

According to a second aspect of the present invention, there is provided a method of producing an air bag device, which method comprises the steps of (a) preparing an air bag, the air bag having a mouth portion which includes first and second outside sewed parts and a center non-sewed part, each outside sewed part being provided by sewing mutually facing side end sections of the mouth portion, the center non-sewed part lo including two mutually facing center end sections each having bolt openings; (b) inserting an elongate gas generator longitudinally into the air bag through the center non-sewed part, the gas generator having bolts extending therefrom; (c) moving the elongate gas generator in the air bag to the mouth portion having the bolts exposed to the outside through the center non-sewed part; (d) putting one of the mutually facing center end sections on the elongate gas generator while receiving the bolts in the corresponding bolt openings; (e) putting the other of the mutually facing center end sections on the elongate gas generator while receiving the bolts in the corresponding bolt openings; (f) putting a unit including the air bag and the elongate gas generator into a housing; and (g) securing the unit to the housing.

BRIEF DESCRIPTION OF THE DRAWINGS

Other objects and advantages will become apparent from the following description when taken in conjunction with the accompanying drawings, in which.

DETAILED DESCRIPTION OF THE INVENTION

Figure 1:
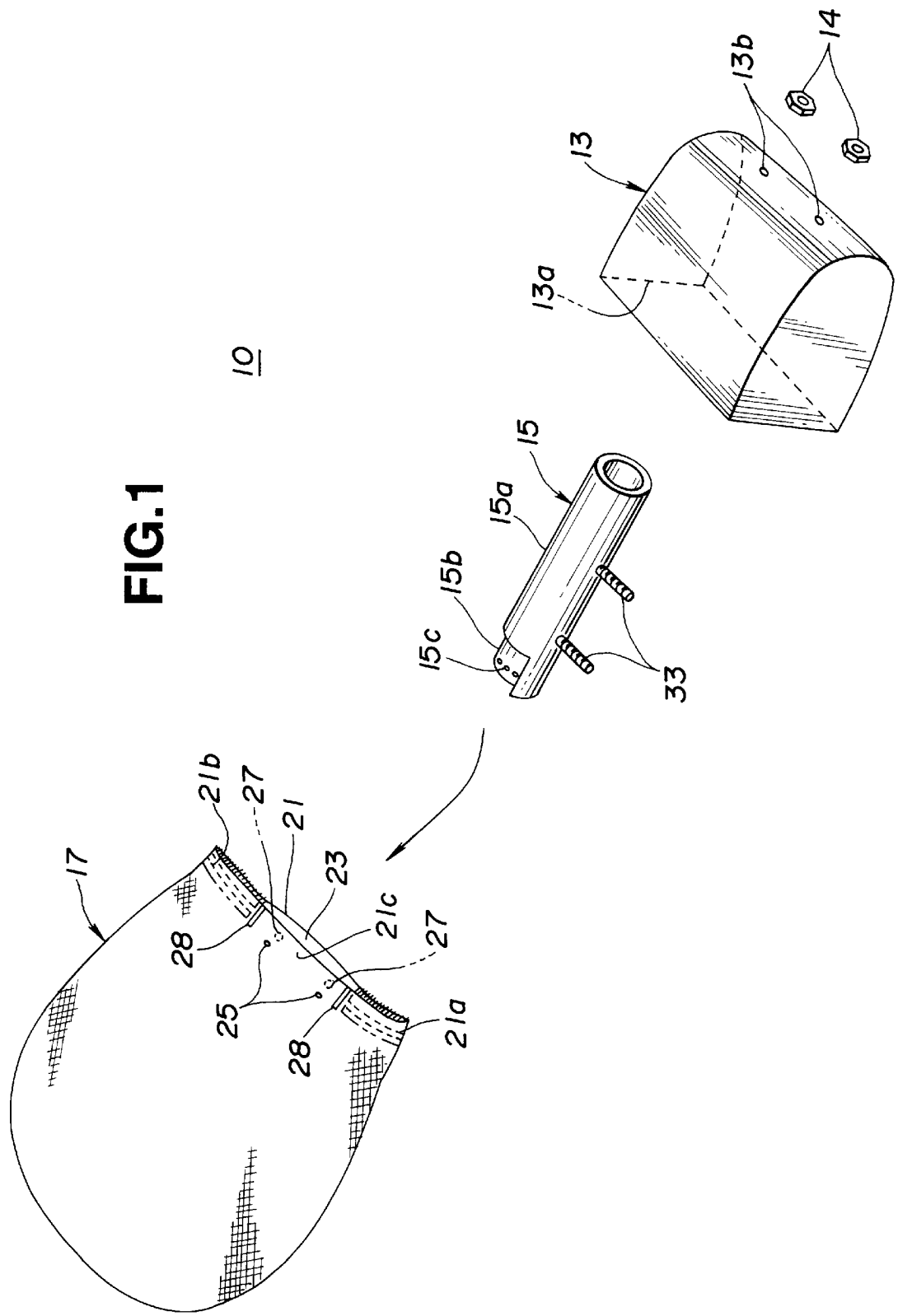
FIG. 1 is a schematically illustrated exploded view of an air bag device of the present invention.
Figure 2:
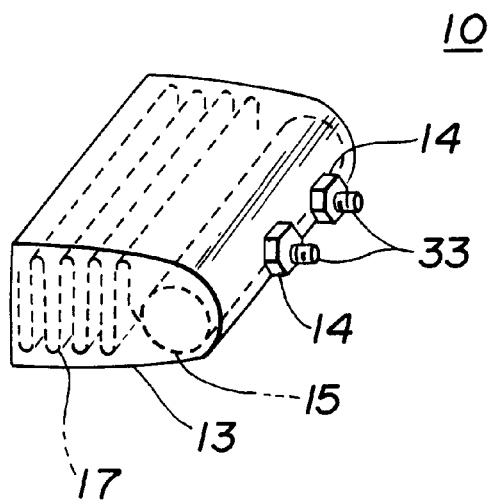
FIG. 2 is a perspective view of the air bag device in an assembled condition.

Referring to FIGS. 1 to 4B, particularly FIGS. 1 and 2, there is shown an air bag device 10 according to the present invention.

The air bag device 10 shown in the drawings is designed for use as a side air bag device mounted to an outer side of a seatback of a seat mounted in a motor vehicle. Of course, the air bag device 10 can be applied to other portions, such as a steering wheel, a front or side panel of the vehicle, a back side of a seatback and the like.

As is seen FIGS. 1 and 2, the air bag device 10 comprises a housing 13 which is tightly installed in a recess formed in the outer side of the seatback.

As is seen from FIG. 2, within the housing 13, there are installed a gas generator unit 15 and an air bag 17 in such a manner as will be described hereinafter.

As is understood from FIG. 1, the housing 13 has a rectangular opening 13a which faces toward a position where inflation of the air bag 17 is required. The housing 13 has at a rear wall thereof two bolt openings 13b.

The gas generator unit 15 comprises a cylindrical case 15a and a cylindrical gas generator proper 15b concentrically installed in the cylindrical case 15a. The cylindrical case 15a has two bolts 33 secured thereto. The cylindrical case 15a is formed at one end thereof with a recess (no numeral) to which gas outlet openings 15c of the gas generator proper 15b are exposed.

The air bag 17 has a unique mouth portion 21 which comprises first and second outside sewed parts 21a and 21b and a center non-sewed part 21c. Each outside sewed part 21a or 21b is provided by sewing mutually facing side end sections of the mouth portion 21. The center non-sewed part 21c thus has an opening 23 defined between mutually facing center end sections of the mouth portion 21, as shown.

It is to be noted that the opening 23 is so sized as to permit the gas generator unit 15 to enter the air bag 17 lengthwise, and the mouth portion 21 is so sized as to permit the gas generator unit 15 to lay crosswise therein.

The mutually facing center end sections of the mouth portion 21 have each two bolt openings 25 or 27. These bolt openings 25 and 27 become registered when the two center end sections are properly overlapped in an after-mentioned manner.

The center non-sewed part 21c of the mouth portion 21 has two laterally spaced slits 28 formed in one of the center end parts.

In the following, steps for assembling the air bag device 10 of the invention will be described with reference to the drawings, particularly FIG. 1.

Figure 3:
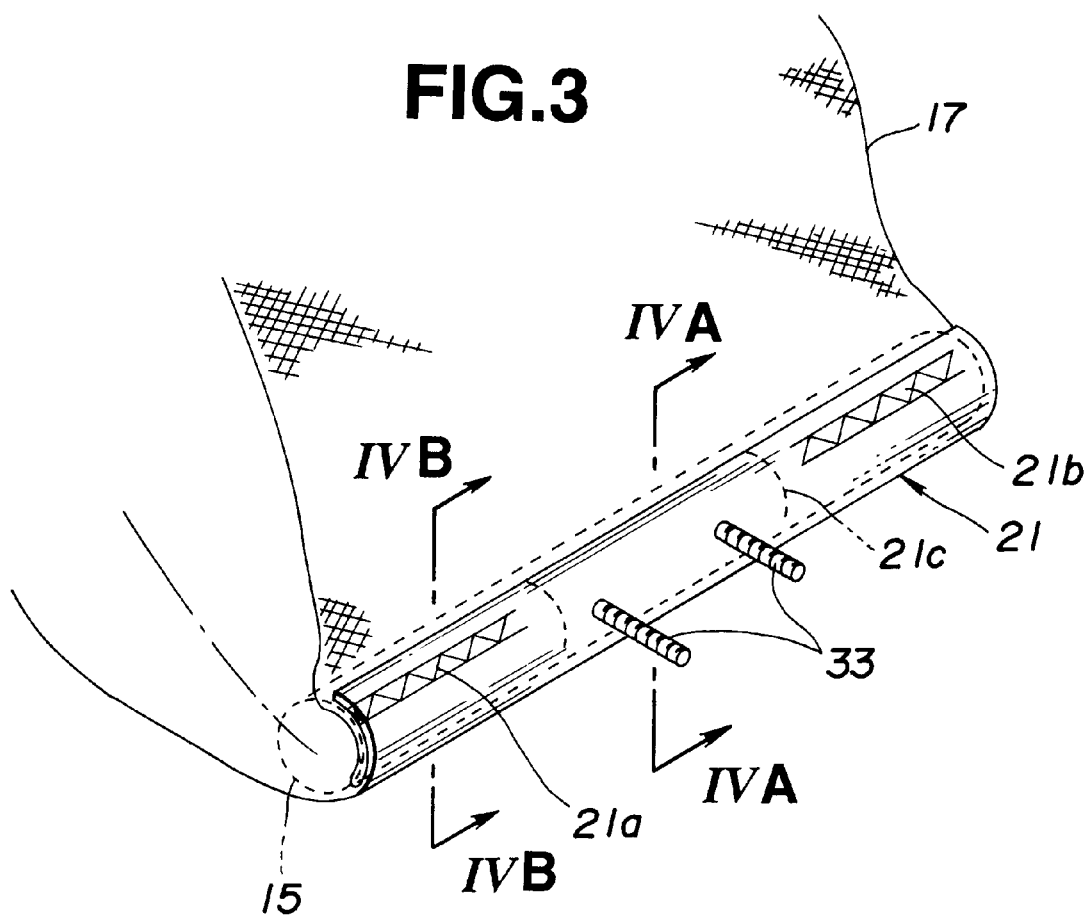
FIG. 3 is a sketch showing a manner in which a gas generator unit is received in a mouth portion of an air bag.
Figure 4A:
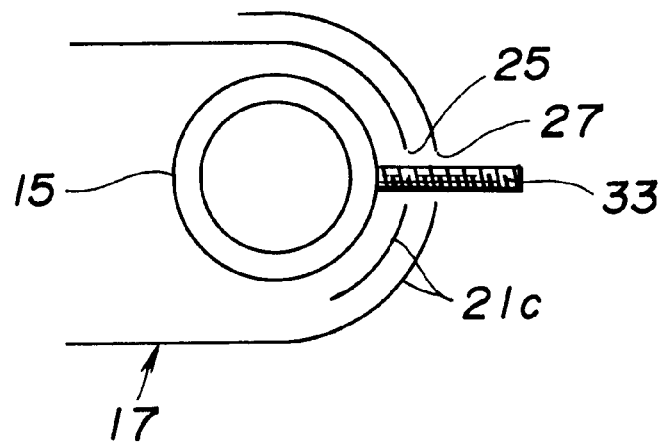
FIG. 4A is a sectional view taken along the line "IVA—IVA" of FIG. 3.
Figure 4B:
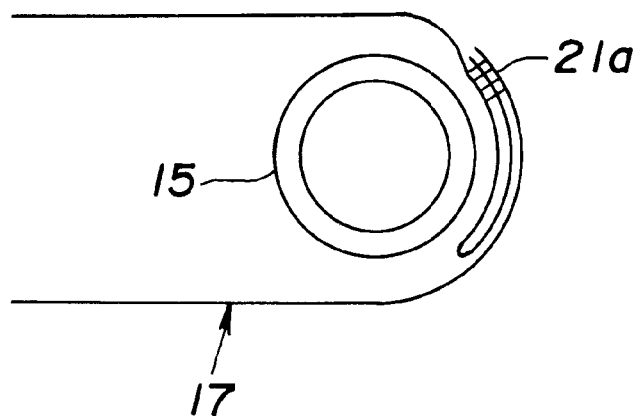
FIG. 4B is a sectional view taken along the line "IVB—IVB" of FIG. 3.

First, as is seen from FIG. 1, the gas generator unit 15 is put into the air bag 17 with one end thereof facing the opening 23 of the air bag 17. Once put into the air bag 17, the gas generator unit 15 is turned about 90 degrees and moved to the mouth portion 21 having the bolts 33 directed to the outside through the opening 23. Then, the upper section of the center non-sewed part 21c is put around the gas generator unit 15 while receiving the bolts 33 in the bolt openings 25, and then, as is understood from FIGS. 3 and 4A, the lower section of the center non-sewed part 21c is put around the gas generator unit 15 (more specifically, the upper section on the unit 15) while receiving the bolts 33 in the bolt openings 27. Under this condition, the semi-assembled parts show such a figure as shown in FIG. 3. Although not shown in this drawing, electric wires from the gas generator unit 15 are also exposed to outside through the registered bolt openings 25 and 27. Then, suitable sealing compound is applied to the slits 28 and other portions to assure a sealed connection between the gas generator unit 15 and the air bag 17. Then, the bolts 33 extending from the gas generator unit 15 are inserted into the bolt openings 13b of the housing 13 and secured thereto by using nuts 14. Then, the air bag 17 is folded up in the housing 13. Thus, under this condition, the entire of the air bag device 10 appears as shown in FIG. 2. Of course, the opening 13a of the housing 13 is covered with a lid member.

In the following, advantages of the air bag device 10 of the present invention will be described.

Figure 5:
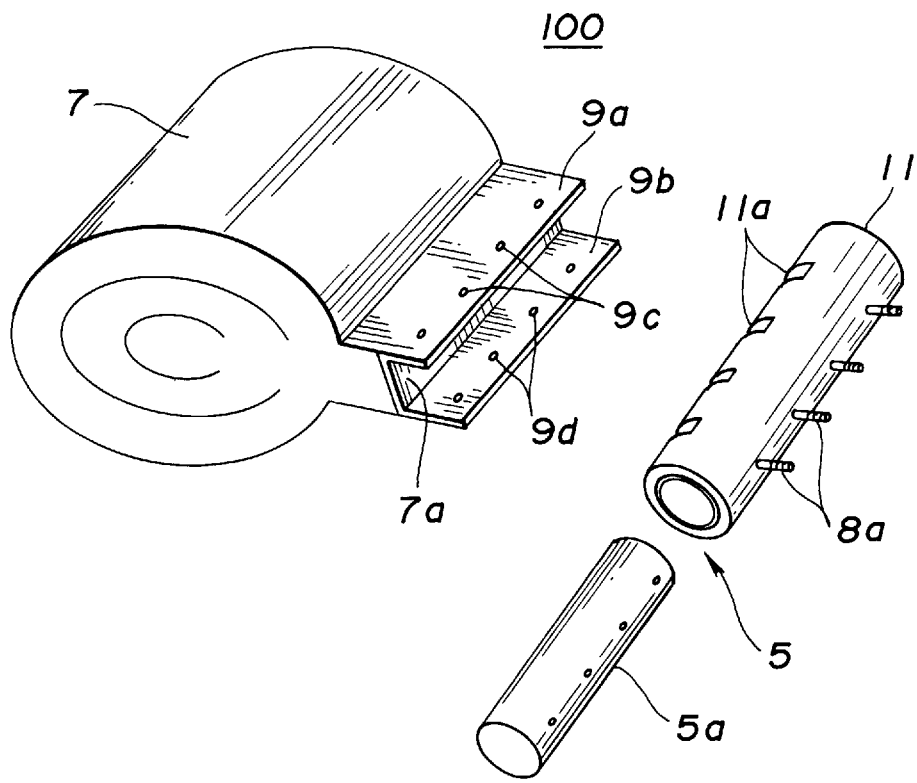
FIG. 5 is a schematically illustrated exploded view of a conventional air bag device.
Figure 6:
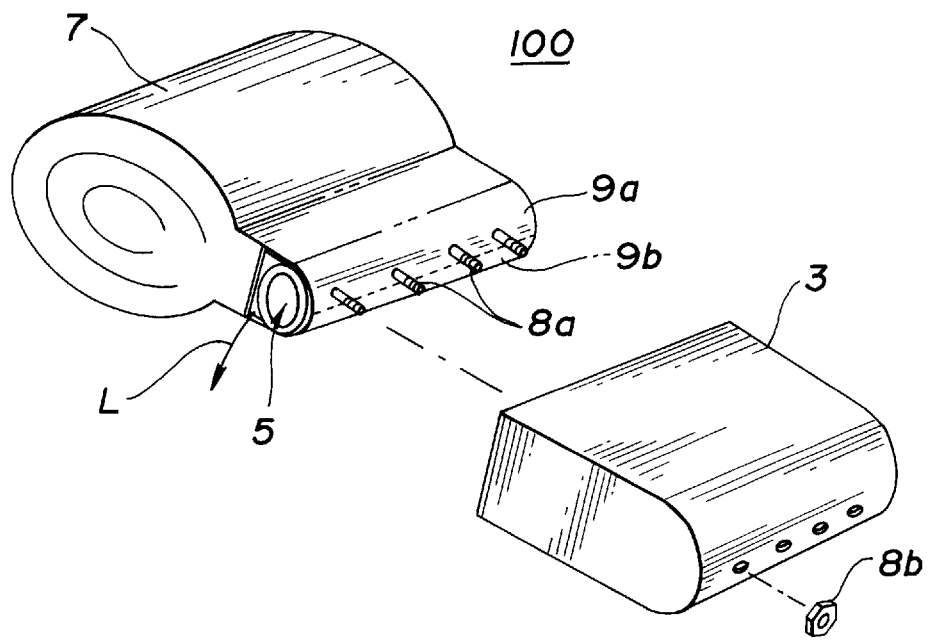
FIG. 6 is another exploded view of the conventional air bag device.

First, because the gas generator unit 15 is substantially entirely received in the air bag 17, such a leakage "L" as has been mentioned in the part of the conventional device 1 of FIGS. 5 and 6 does not occur. Furthermore, sealing work is easily carried out as compared with that of the conventional device 100.

Second, the mouth portion 21 of the air bag 17 is reinforced by the first and second outside sewed parts 21a and 21b. This promotes assured connection between the air bag 17 and the gas generator unit 15.

Third, due to provision of the slits 28, the work for putting the mouth portion 21 of the air bag 17 around the cylindrical gas generator unit 15 is easily achieved.

It is to be understood that, although the invention has been described with specific reference to particular embodiments thereof, it is not to be so limited since changes and alternations therein may be made which are within the full intended scope of this invention as defined by the appended claims.

What is claimed is:

1. An air bag device comprising:
    an air bag having a mouth portion, said mouth portion including first and second outside sewed parts and a center non-sewed part, each outside sewed part being provided by sewing mutually facing side end sections of said mouth portion, said center non-sewed part including two mutually facing center end sections each having bolt openings and a leading end, said two mutually facing center end sectins extending toward each other and put on each other;
    an elongate gas generator having bolts extendign therefrom, said gas generator being substantially entirely received in said mouth portion having said bolts exposed to the outside throug said bolt openings of said two mutuallly facing center end sections;
    a housing for receiving a unit including said air bag and said gas generator, said housing having bolt openings through which said bolts pass; and
    nuts engaged with said bolts to secure said unit to said housing;
    wherein one of said mutually facing center end sections is formed with laterally spaced slits.
2. An air bag device as claimed in claim 1, in which said two mutually facing center end sections are put around said gas generator with their leading ends directed in opposed directions.
3. An air bag device as claimed in claim 2, in which said gas generator is cylindrical in shape.
4. An air bag device as claimed in claim 1, in which said gas generator comprises:
    a cylindrical case having said bolts, said cylindrical case being formed at one end thereof with a recess; and
    a cylindrical gas generator proper installed in said cylindrical case, said gas generator proper having gas outlet openings exposed to the recess of said cylindrical case.

* * * * *